March 12, 1968 K. KELLER 3,373,299
THERMAL POWER PLANT WITH MHD GENERATOR
Filed Oct. 19, 1964 2 Sheets-Sheet 1

INVENTOR
KURT KELLER

BY Dodge and Sons
ATTORNEYS

INVENTOR
KURT KELLER

BY Dodge and Sons

ATTORNEYS 3,373,299
THERMAL POWER PLANT WITH MHD GENERATOR
Kurt Keller, Kusnacht, Switzerland, assignor to Escher Wyss Aktiengesellschaft, Zurich, Switzerland, a corporation of Switzerland
Filed Oct. 19, 1964, Ser. No. 404,579
Claims priority, application Switzerland, No. 7, 1963, 13,650/63
10 Claims. (Cl. 310—11)

ABSTRACT OF THE DISCLOSURE

Schemes for utilizing the waste heat of a magnetohydrodynamic (MHD) generator in a closed circuit gas turbine power plant. The gas turbine circuit may be separate from or include the circuit of the MHD generator. In the latter case, the MHD generator is located either in series with the power plant components, or in a by-pass connection between high and low pressure points of the closed circuit. A similar shunt or by-pass connection, containing a cooler and an expansion turbine, can be employed to produce a stream of low temperature gas that is utilized to cool the magnet of the MHD generator.

Figure 1:
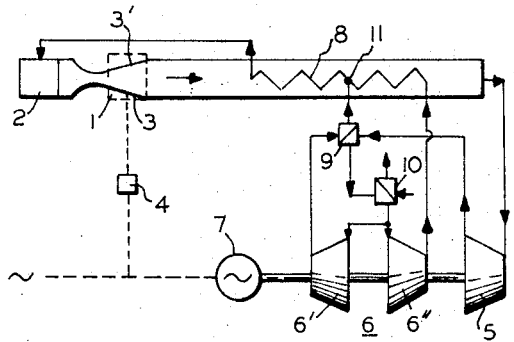

This invention relates to a thermal power plant with magnetohydrodynamic (MHD) generator and waste heat utilization.

The MHD generators known heretofore can be realised only between two high-temperature limits. The gaseous flow medium leaves the MHD generator at a temperature which may be more than 2000° C. Utilization of the waste heat is thus of considerable importance for the economy of the plant.

This invention now consists in that a gas turbine installation operating with closed circuit of the working gas is provided for utilizing the waste heat of the MHD generator.

In one type of embodiment, the MHD generator is in series with the components of the gas turbine plant and is located between the turbine and the compressor. The compressed working gas flowing from the compressor to the heater of the MHD generator receives heat from the exhaust gas of the generator and, prior to this heating step, a portion of the compressed gas is initially preheated by the expanded working gas leaving the turbine. In another type of embodiment, the MHD generator is interposed in a by-pass path extending between high and low pressure points in the closed circuit of the gas turbine plant. The closed circuit includes a heater, in which the compressed working gas flowing to the turbine is heated by the exhaust gas coming from the MHD generator, and said high pressure point may be located either between the compressor and the heater or between the heater and the turbine. In cases where the turbine has two stages, the high pressure end of the by-pass path could also be located between stages.

According to a further feature of the invention, the gas turbine circuit can be equipped with a shunt or by-pass path which extends between high and low pressure points and which contains a cooler and an expansion turbine. This arrangement provides a stream of low temperature working gas which is used to cool the magnet coil of the MHD generator and thereby render it superconductive.

Each of FIGS. 1 to 6 of the accompanying drawings shows a constructional example of the subject of the invention in simplified representation.

The MHD generator is denoted by 1. Gaseous, ionised flow medium, coming from a pre-connected heater 2, for example a nuclear reactor, is led to said generator. This flow medium is raised in the heater 2 to a high temperature, for example above 2000° C. The electrical direct current generated is taken off at terminals 3, 3' and converted to alternating current in a converter 4.

The gas turbine installation has a turbine 5 and a compressor 6, the latter comprising two parallel-connected parts 6' and 6". The turbine 5 drives the compressor 6. The surplus power is fed to an A.C. generator 7.

According to FIG. 1, the working gas coming from the MHD generator 1 and still having a high temperature first passes through a surface heat exchanger 8 and then enters the turbine 5, in which it expands to a lower pressure. It then passes through a further surface heat exchanger 9 and a cooler 10 and is then raised to a high pressure in the compressor 6. The compressed working gas discharged by compressor 6 is led to heat exchanger 8; the portion of this gas coming from compressor part 6' passing through heat exchanger 9, where it receives heat from the expanded working gas leaving turbine 5, and entering heat exchanger 8 at a point 11 at which the compressed gas coming directly from compressor part 6" has undergone preheating. After the compressed gas has passed through and been heated in heat exchanger 8, it is delivered to the heater 2, thus closing the circuit. The working circuit of the gas turbine plant is therefore here connected to the MHD generator, and the same flow medium passes through it as through the latter. Since the MHD generator is connected in series with the individual machines and apparatus of the gas turbine plant, it forms a component of the working circuit system of the gas turbine installation.

Figure 2:
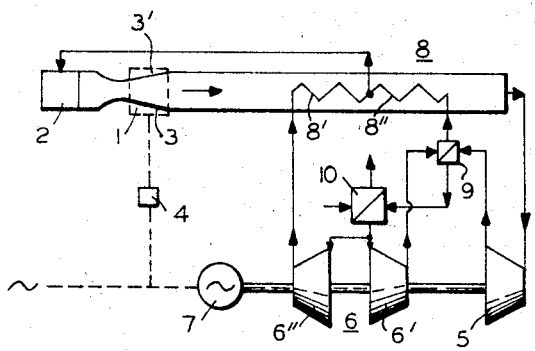

According to FIG. 2 the heat exchanger 8 consists of two parts 8' and 8", through which the working gas coming from the MHD generator flows in succession. The working gas coming directly from the compressor 6" passes through the first part 8' in parallel flow, and the working gas coming from the heat exchanger 9 passes through the second part 8" in counterflow. This arrangement permits good cooling of the parts of the heat exchanger 8, which are exposed to the hottest gas.

Figure 3:
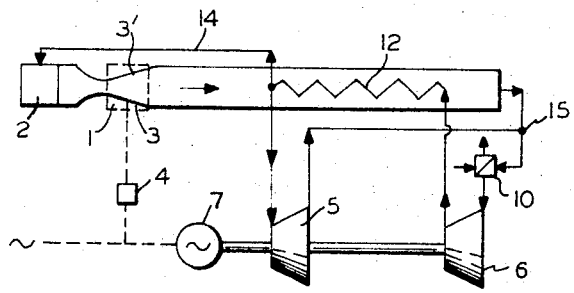
Figure 4:
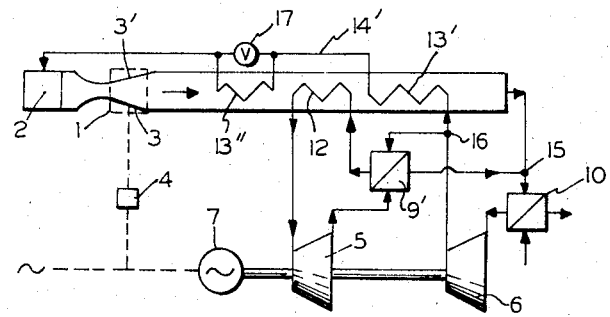
Figure 5:
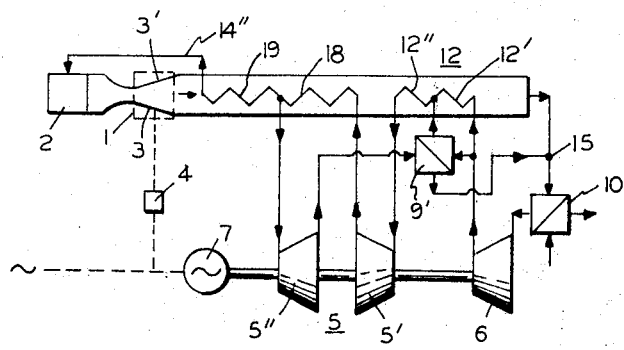

As distinct from the previous embodiments of the subject of the invention, according to FIGS. 3, 4 and 5, the MHD generator 1 is inserted in a by-pass connection between a high-pressure point and a low-pressure point of the closed circuit of the gas turbine installation.

According to FIG. 3, a conduit 14 branches off between compressor 6 and turbine 5, namely at the outlet side of the high-temperature surface heat exchanger 12 for the compressed working gas, and said conduit supplies part of the working gas delivered by the compressor 6 to the heater 2. This part of the working gas then flows through the MHD generator 1 and is finally returned to the gas turbine circuit at a point 15 situated upstream of the pre-cooler 10, on the flow path leading from the turbine 5 to the compressor 6.

FIG. 4 shows a similar embodiment of the subject of the invention. However, in this case, heat exchanger 12 heats only the compressed gas flowing to turbine 5, and it is preceded by a further heat exchanger 9' which transfers to the compressed gas heat contained in the expanded working gas flowing from turbine 5 to cooler 10. A conduit 14' branches off upstream of the heat exchanger 9' at a high-pressure point 16 for leading part of the compressed working gas to the heater 2. Thus, the same working gas quantity flows through the heat exchanger 9' on both sides of the heat exchanging walls. The branched-off working gas is preheated successively in two heat exchangers 13' and 13" by heating by means of the waste gas of the MHD generator, the heat exchanger 13" with regard to this gas being situated upstream of the heat exchanger 12 and the heat exchanger 13' being situated downstream of the heat exchanger 12. The heat exchanger 13' may also be bypassed by opening a valve 17.

According to FIG. 5, the turbine 5 has two series-connected expansion stages 5', 5". Between these expansion stages is an intermediate heater 18 heated by the waste gas of the MHD generator. A conduit 14" branches off at the outlet of this intermediate heater, in which still a higher pressure prevails than at point 15, and leads to the heater 2 for the working gas to be supplied to the MHD generator. To this conduit 14" there also belongs a heat exchanger 19, in which this working gas is pre-heated by the waste gas of the MHD generator.

The outlet side of the second expansion stage 5" is connected to the point 15 situated in front of the pre-cooler 10. The working gas coming from the second expansion stage 5" of the turbine 5, before being supplied to the pre-cooler 10, gives up heat in the heat exchanger 9' to part of the compressed working gas, which is preferably equal in magnitude to the part of the working gas flowing through the second expansion stage 5" of the turbine 5. The heat exchanger 12, in which the working gas to be supplied to the turbine 5 is heated by the waste gas of the MHD generator, consists of two parts 12' and 12". In the first part 12', the working gas coming directly from the compressor 6 is pre-heated. In the second part 12", the working gas thus pre-heated is heated further, together with the compressed working gas coming from the heat exchanger 9'.

Figure 6:
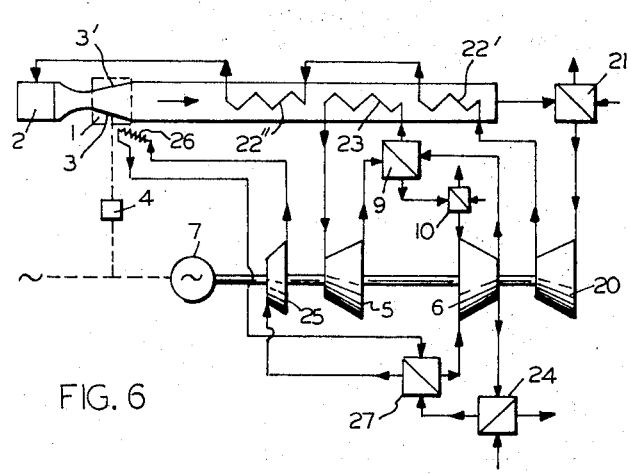

In the embodiment of the subject of the invention represented in FIG. 6, the working circuit of the gas-turbine installation is separate from the flow path of the working gas passing through the MHD generator 1. A separate compressor 20, which is connected downstream of a cooler 21, is used for delivering the compressed gas to be led to the MHD generator. In series-connected heat exchangers 22', 22", the gas coming from the MHD generator 1 gives up heat to the gas coming from the compressor 20. The working circuit of the gas turbine installation leads through the turbine 5, heat exchanger 9, pre-cooler 10, compressor 6, again through the heat exchanger 9 and finally through a heat exchanger 23, in which the waste gas of the MHD generator gives up heat to the compressed working gas of the gas turbine installation, before said working gas is supplied to the turbine 5. With reference to the waste gas of the MHD generator 1, heat exchanger 23 lies between the heat exchangers 22" and 22'.

The MHD generator in FIG. 6 includes a cooler 26 for the magnet coil, and the gas turbine circuit is provided with a shunt path for leading low temperature working gas through this cooler. The shunt path extends between points at different pressures, and specifically between the outlet and inlet of compressor 6, and contains a cooler 24 and an expansion turbine 25, the latter being connected to deliver power to the shaft of the gas turbine installation. The cooled gas delivered to cooler 26 by cooler 24 and turbine 25 returns to the main working circuit through a heat exchanger 27 wherein it serves to cool the gas flowing from cooler 24 to turbine 25. With suitable design of the components in this shunt path, such low temperature may be attained in cooler 26 that the magnet coil becomes superconducting. As a result, it is possible to use small conductor cross sections.

What is claimed is:

1. In combination a gas turbine installation operating with a closed working gas circuit leading serially through heating means, turbine means, cooling means, compressing means and again through said heating means, in the order stated; and a by-pass connection between a high-pressure point and a low-pressure point of said closed circuit, comprising a heater and a MHD generator through which part of the working gas flows serially in the order stated from said high-pressure point to said low-pressure point; said heating means comprising a high-temperature surface heat exchanger for the heat transfer from the gas coming from the MHD generator, to the compressed gas to be supplied to the turbine means.

2. The combination defined in claim 1 in which said high-pressure point of the closed circuit is situated between said high-temperature surface heat exchanger and the turbine means, and said low-pressure point of the closed circuit is situated in front of the cooling means.

3. The combination defined in claim 1 in which the closed circuit comprises a further surface heat exchanger for the heat transfer from the gas flowing from the turbine means to the cooling means, to at least part of the compressed gas coming from the compressing means.

4. The combination defined in claim 3 in which said high-pressure point of the closed circuit is situated between the compressing means and said further surface heat exchanger, and in which said by-pass connection comprises a heat exchanger for the heat transfer from the gas coming from the MHD generator to the gas to be supplied to the heater.

5. The combination defined in claim 3 in which the turbine means comprise two series-connected expansion stages and a further high-temperature surface heat exchanger is provided for the heat transfer from the gas coming from the MHD generator, to the gas flowing from the first of said expansion stages to the second expansion stage.

6. The combination defined in claim 5 in which said high-pressure point of the closed circuit is situated between said further high-temperature surface heat exchanger and the second expansion stage of the turbine means.

7. The combination defined in claim 1 in which said by-pass connection comprises at least one heat exchanger for the heat transfer from the gas coming from the MHD generator to the gas to be supplied to the heater.

8. A thermal power plant comprising in combination an MHD generator; a heater for supplying hot working gas to the generator; a gas turbine installation having turbine means, cooling means and compressing means; flow connections defining a closed circuit for working gas leading serially through the heater, the generator, the turbine means, the cooling means, the compressing means and again through the heater, in the order stated; a high temperature surface heat exchanger for transferring heat from the working gas leaving the generator to the working gas flowing from the compressing means to the heater; and a second surface heat exchanger for transferring heat from the working gas leaving the turbine means to part of the working gas leaving the compressing means; the closed circuit having two branches for the compressed working gas leaving the compressing means, the first branch leading directly to the high temperature surface heat exchanger, and the second branch leading through the second surface heat exchanger and opening into the high temperature surface heat exchanger at a point at which the working gas arriving through the first branch has already received heat in the high temperature surface heat exchanger.

9. A thermal power plant comprising in combination an MHD generator; a heater for supplying hot working gas to the generator; a gas turbine installation having turbine means, cooling means and compressing means; flow connections defining a closed circuit for working gas leading serially through the heater, the generator, the turbine means, the cooling means, the compressing means and again through the heater, in the order stated; a high temperature surface heat exchanger for transferring heat from the working gas leaving the generator to the working gas flowing from the compressing means to the heater, the heat exchanger having first and second parts through which gas coming from the generator flows in succession; and a second surface heat exchanger for transferring heat from the working gas leaving the turbine means to part of the working gas leaving the compressing means; the closed circuit having two branches for the compressed working gas leaving the compressing means, the first branch leading directly to the first part of the high temperature surface heat exchanger and causing compressed gas to pass through this part in parallel with the gas coming from the generator, and the second branch leading to the second part of the high temperature heat exchanger through the second heat exchanger and causing compressed gas to pass through this part in counterflow to the gas coming from the generator.

10. A thermal power plant comprising in combination an MHD generator having a magnet winding provided with a cooler; a heater for supplying hot working gas to the generator; a closed circuit gas turbine installation; means for utilizing the heat content of the gas leaving the generator to produce power in said closed circuit gas turbine installation; a shunt connection between high and low pressure points in said closed circuit installation and extending through the cooler of the magnet winding; and a second cooler and an expansion turbine located in the shunt connection and arranged to lower the temperature of gas flowing to the cooler of the magnet winding.

References Cited
UNITED STATES PATENTS

| | | | |
|---|---|---|---|
| 3,140,410 | 7/1964 | McLafferty | 310—11 |
| 3,140,411 | 7/1964 | Oickle | 310—11 |
| 3,214,615 | 10/1965 | Way | 310—11 |
| 3,283,183 | 11/1966 | Yano | 310—11 |
| 3,218,807 | 11/1965 | Berchtold et al. | 60—59 |

OTHER REFERENCES

Paper by Hamilton, reproduced in collection entitled "Engineering Aspects of Magnetohydrodynamics," edited by Mannal and Mather and published in 1962 by Columbia University Press; N.Y. and London; pp. 211 and 216 through 219 (copy in Group 214).

DAVID X. SLINEY, *Primary Examiner.*